April 28, 1931.   G. VON ARCO   1,802,742
PHASE INDICATOR FOR FEEBLE HIGH FREQUENCY CURRENTS
Filed July 2, 1926
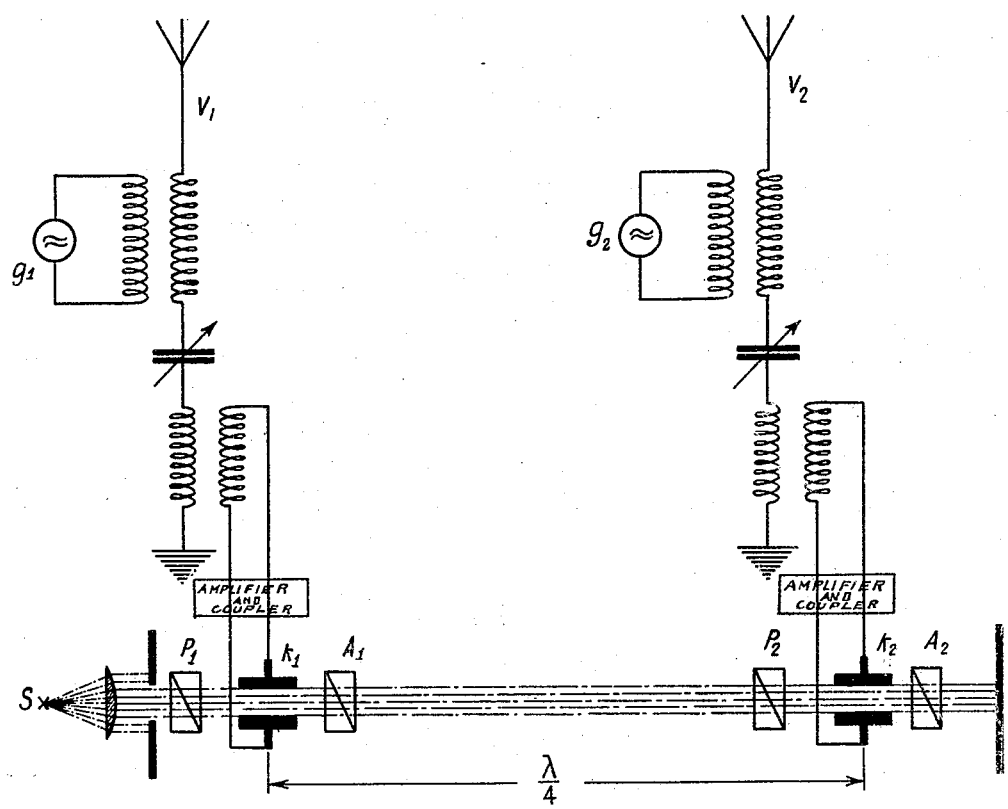
INVENTOR.
GEORG VON ARCO
BY *Ira J. Adams*
ATTORNEY Patented Apr. 28, 1931

1,802,742

UNITED STATES PATENT OFFICE

GEORG VON ARCO, OF BERLIN, GERMANY, ASSIGNOR TO GESELLSCHAFT FUR DRAHT-LOSE TELEGRAPHIE M. B. H., OF BERLIN, GERMANY

PHASE INDICATOR FOR FEEBLE HIGH-FREQUENCY CURRENTS

Application filed July 2, 1926, Serial No. 120,070, and in Germany July 13, 1925.

There is a great demand for a phase indicator device in so far as both the transmitting as well as the receiving stations are compelled to operate with multiple antennæ carrying currents of different phases, on the one hand, in order to diminish atmospheric disturbances, and on the other hand, on account of the increasingly great number of stations.

The solution of the problem is made particularly difficult on the ground that the indicator device must be entirely free from inertia with reference to high-frequency currents, and further because on account of the insertion of the phase indicator, considerable reactions of some energetic sort, especially as regards the phase position, are occasioned by the instrument itself.

Now, the feature of the invention consists in that the Kerr cell (electric double refraction in a condenser filled with a suitable medium), especially in the improved form thereof devised by Karolus, is utilized for the purposes of phase indication. Of course, the simple or an individual cell is unsuited for this object, indeed, it is either necessary to provide as many cells as there are phases to be observed, or else the cells must be so formed and arranged that the light ray is controlled by two or more electrical fields.

The action to be brought upon the light which is made to pass through such a cell, generally requires an unduly high frequency energy, and such an energy is not available for the purposes of the measurements and observations in question, so that it becomes necessary to use amplifier tubes in combination with the cells. For the object of correct phase indication, resistance coupling would primarily be suited for connection inasmuch as in this manner no unintended or uncontrollable shifting of phases is possible.

To now make direct reference to the drawing which forms a part of my disclosure, $V_1$ and $V_2$ represent the two aerials whose current phases are to be compared with each other. Each of the aerials $V_1$ and $V_2$ is supplied with energy from a generator, $G_1$ and $G_2$, which may be, for example, a tube generator. To ascertain the phase relations, as can be seen from the drawing, two separate outfits of an optical kind are used, which comprise Kerr cells, mounted, for example, ¼ wave-length apart. Through these two optical outfits light emitted from a luminous source S is passed. As an essential part of each optical arrangement, there is provided a Kerr cell $K_1$ associated with the antenna system $V_1$ and a second cell $K_2$ is directly associated with the antenna system $V_2$ and the polarizers $P_1$ and $P_2$ together with the analyzers $A_1$ and $A_2$. From each antenna a potential is applied to the Kerr cell coordinated and associated therewith. For example, a potential is supplied to the cell $K_1$ from the antenna system $V_1$ and to the cell $K_2$ from the antenna $V_2$. When the current of both antennæ are cophasal, provided that the leads do not cause any additional phase displacement, the potentials across the Kerr cells will be in phase agreement. Since the difference in path to be covered by the light from one cell to the other amounts to a quarter wave, it follows that the ray of light that has passed through the first outfit will reach the second outfit only after a quarter period has elapsed.

From the above description of the apparatus it obviously follows that the potentials applied to the Kerr cells $k_1$ and $k_2$, from the amplifier and coupler associated with each, are in phase, but with the cells spaced at a quarter wave length apart any particular light beam which passes through the cell $k_1$ toward $k_2$ will not reach the cell $k_2$ until such a time as the energy applied to the said second cell is 90° out of phase with respect to the energy supplied to the identical light beam when it passed through the first cell.

It is a well known fact that where there is no potential applied to a Kerr cell there can be no action upon the polarized light passing therethrough so that beyond a Kerr cell to which no potentials are applied no light will be observed. However, when electrical potentials are impressed upon the plates of Kerr cells through which light is directed the plane polarized light beam passing through the cell, which under conditions where no potentials are applied would be blocked by the analyzer, is doubly refracted, or, as it has been termed by many engineers, "elliptically polarized" and light governed in accordance with the applied potentials passes through the cell. From this it readily appears that maximum potentials applied to the cell will give maximum light output and zero potential applied will give zero light output.

From the above facts it follows that where light is emitted from the source S and is directed through the Nicol prism $P_1$ to the cell $k^1$ at any particular time, it may be assumed that maximum potential is applied to the cell $k_1$ from the antenna $V_1$ the "elliptical" polarization of a plane polarized light beam issuing from the Nicol prism $P_1$, and the analyzer $A_1$, which polarizes the light in a plane at right angles to the plane in which the Nicol prism $P_1$ polarizes the light from source S, will then permit light to pass, since it will be unable to block the light which has been doubly refracted or "elliptically" polarized. Therefore, light passing beyond the analyzer $A_1$ will be directed to the polarizer $P_2$ and passed through the Kerr cell $k_2$. Since light and electrical energy travel at approximately the same speed it will readily be seen that by the time light from the analyzer $A_1$ has reached the cell $k_2$, the potential applied to the cell, if the generators $G_1$ and $G_2$ are cophasal, will be ¼ cycle out of phase with respect to the potential applied to this particular light beam when it passes through the cell $k_1$, and the potential will be of zero value on $k_2$, if it is assumed that there was maximum potential on the plates of $k_1$ when the particular light beam passed. The cell $k_2$ will have no effect, therefore, upon the light passing through it and the analyzer $A_2$ will completely block any light from impinging upon the screen.

However, should the generators $G_1$ and $G_2$ be slightly out of phase there will not be a complete absence of potential upon the plates of the cell $k_2$ at the time the light beam from $k_1$ reaches $k_2$ and a certain amount of light will be passed through $k_2$. From the above it follows that by observation of the screen illumination produced by light from the cell $k_2$ it is possible to readily calculate the phase difference between the two generators $G_1$ and $G_2$, or, if the antenna $V_1$ and $V_2$ are used for receiving, to determine direction by any known principles.

Having described my invention, I claim:

1. A radio signalling system, including, a plurality of antenna systems, generators for energizing each of said antenna systems, a Kerr cell associated with each of said antenna systems, an amplifier and coupler for directing energy from each of said antenna systems to the plates of said Kerr cells, a light source, means for directing light from said source to one of said Kerr cells, means for passing the light issuing from said Kerr cell to the second of said Kerr cells, and means controlled by the potentials acting upon the plates of said Kerr cells in accordance with the phase relationship of the voltages in each of said antenna systems for controlling the amount of light passing through said cells and providing a means whereby phase displacements between signals in each of said antenna systems may be calculated in accordance with the amount of light passing through the said Kerr cells.

2. A radio signalling system, including, a plurality of antenna systems spaced a predetermined fraction of a wave length apart, a generating means for energizing each of said antenna systems, a Kerr cell associated with each of said antenna systems, and an amplifier and coupler connected to each of said Kerr cells and said antenna systems for transferring energy from the respective antenna systems to its associated Kerr cell, a light source, means for directing the light issuing from said light source to one of said Kerr cells, means for passing the light issuing from the first of said Kerr cells to the second of said cells, and means provided by the relationship between the spacing of said Kerr cells and the normal phase relationship of the energy in said antenna systems for determining variations in phase shift occasioned in the said generators applying energy to said antenna systems.

3. A radio signalling system, including, a plurality of spaced antenna systems, a Kerr cell associated with each of said antenna systems, an amplifying and coupling means connected with said antenna systems and said Kerr cells for transferring energy from said antenna systems to said Kerr cells, a light source, means for directing the light issuing from said source to one of said Kerr cells, means for controlling said light passing through said Kerr cell in accordance with potentials applied thereto from said associated antenna system through said amplifier and coupler, means for directing the controlled light passing through said Kerr cells to a second Kerr cell, means for controlling said light passing through said second Kerr cell in accordance with the potentials applied from the second antenna system through said amplifier and coupler associated with said second cell, and means provided by a determination of the light passing said second Kerr cell for determining the relative phase relationship of signal potentials in each of said antenna systems.

GEORG VON ARCO.